United States Patent [19]

Borzym

[11] 3,958,467
[45] May 25, 1976

[54] METHOD FOR MAKING DIE JAW INSERTS FOR TUBE CUTOFF MACHINES

[75] Inventor: John J. Borzym, Birmingham, Mich.

[73] Assignee: Alpha Industries, Inc., Detroit, Mich.

[22] Filed: Mar. 31, 1975

[21] Appl. No.: 563,603

[52] U.S. Cl. .............................. 76/107 R; 219/69 M
[51] Int. Cl.² ........................................... B21K 5/20
[58] Field of Search ................. 76/4, 101 B, 107 R, 76/107 C; 219/69 E, 69 M

[56] References Cited
UNITED STATES PATENTS

| 2,800,566 | 7/1957 | Matulaitis | 76/107 R X |
| 3,240,914 | 3/1966 | Hill et al. | 76/107 R X |
| 3,498,158 | 3/1970 | Kougel | 219/69 M X |
| 3,727,489 | 4/1973 | Inoue | 76/107 R |

*Primary Examiner*—Al Lawrence Smith
*Assistant Examiner*—James G. Smith
*Attorney, Agent, or Firm*—Thomas N. Young

[57] ABSTRACT

A method for manufacturing die jaw inserts for tube cutoff apparatus. The method comprises the steps of fabricating a pair of die jaw blanks; finish processing the blanks; and subsequently forming the clamping aperture by means of electrical discharge machining of the die jaw insert. An apparatus for performing the method is disclosed.

3 Claims, 6 Drawing Figures

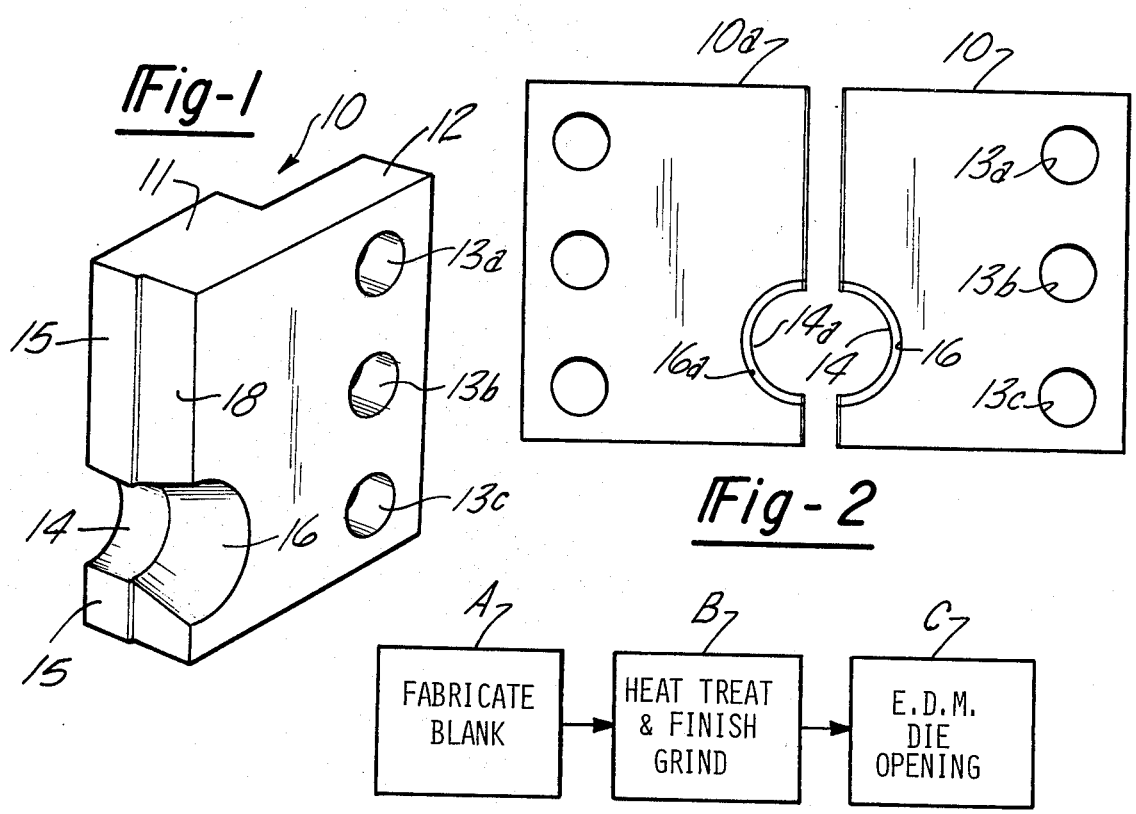
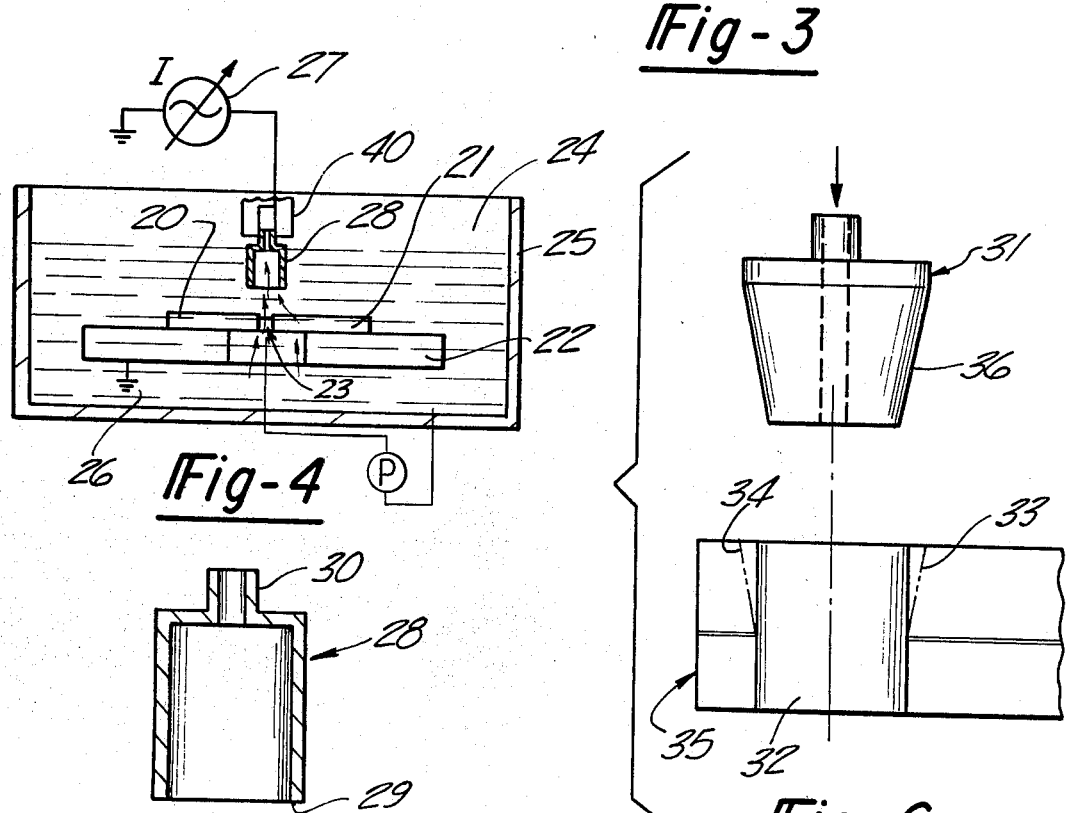

METHOD FOR MAKING DIE JAW INSERTS FOR TUBE CUTOFF MACHINES

INTRODUCTION

This invention relates to a method of manufacturing die jaw inserts for tube cutoff machines and the like with speed and accuracy not heretofore possible with prior art methods.

BACKGROUND OF THE INVENTION

Die jaw inserts are used to clamp tubing in tube cutoff machines during the severing operation. They are typically bolted into a die carriage assembly in two opposing mirrorimage pairs which move toward one another to clamp the tube and away from one another to release the tube. The two pairs are axially spaced to accommodate a severing blade which is driven through the tube by a ram.

The die jaw inserts are subject to wear and disfigurement over extended periods of use due to the contact with the tubing as well as the action of the severing blade. Close tolerances must, however, be maintained for successful operation of the cutoff machine. Therefore, the die jaw inserts are frequently replaced.

There are, of course, many sizes and configurations for the inserts. In the past, die jaw inserts were typically manufactured only on receipt of an order, rather then made up in advance and stored as inventory. Thus, a considerable time delay was often necessary between the receipt and fulfillment of an order.

The inserts could, of course, be prefabricated to a certain degree using prior art techniques; i.e., the blanks may be roughed-out but the clamping aperture may not be formed until the exact size requirement is known. Thus, the heat treating process to harden the inserts must also be delayed, for to preharden the blank makes the aperture too difficult to form using conventional machining techniques. As a result, the bulk of the fabrication process steps were performed after, rather than before, an order was received.

BRIEF SUMMARY OF THE INVENTION

The present invention comprehends a method whereby a manufacturer of die jaw inserts may perform the majority of the fabrication process steps in advance of an order, yet still custom-form the clamping aperture according to a particular order. As a result, the time required to deliver a replacement insert after receipt of an order is substantially reduced. In general, this is accomplished by prefabricating a finished blank; i.e., an insert which is roughed-out, hardened, and machined to final tolerances, but without the clamping aperture having been formed therein, and thereafter forming the aperture using an electrical discharge machining process which neither aneals nor warps the finished blank. The discharge machining process is performed quickly and accurately according to a two-phase technique so as to produce a gripping surface having highly desirable physical characteristics.

In the preferred form of the invention, hereinafter described in detail, the process comprises the following steps: (1) fabricating a blank die jaw insert from stock such that the shape of the insert is complete in all respects except for the critical die opening; (2) hardening the blank insert to the degree required for use in the tube cutoff apparatus; (3) finish grinding the surface of the hardened blank; and (4) electrical discharge machining the blank to create the die opening. It is to be noted that all but the last step may be completed before the manufacturer receives the user's tube size and clamping aperture specifications.

BRIEF DESCRIPTION OF THE DRAWINGS

FIG. 1 is a perspective view of a finished die jaw insert;

FIG. 2 is an elevational view of a matched pair of die jaw inserts;

FIG. 3 is a generalized representation of the steps in the process;

FIG. 4 is a cross-sectional view of complemental die jaw inserts about to undergo rough coring within an electrical discharge machining apparatus;

FIG. 5 is a cross-sectional view of the coring electrode; and,

FIG. 6 is an elevational view of a tapered coring electrode in position prior to chamfering the clamping aperture.

DETAILED DESCRIPTION OF THE SPECIFIC EMBODIMENT

FIG. 1 shows a die jaw insert 10 fabricated from good quality tool steel hardened to approximately 60 $R_c$. Insert 10 comprises a solid rectangular body 11 having the semicircular gripping aperture 14 formed therein and opening to edge 15 as shown. Insert 10 further comprises an integral flange 12 provided with bolt holes 13a through 13c so that the insert may be fastened into a die carriage of the type available from Alpha Industries, Inc. of Detroit, Mich. Similar machines are available from other manufacturers such as Yoder.

Clamping aperture 14 is contiguous with a tapered or conical aperture 16 coaxially formed in body 11 to provide an entry or exit for tubing to be clamped and severed. Surface 18 which axially coextends with tapered aperture 16 is relieved as shown.

Die jaw inserts are employed in two opposing pairs for reciprocal lateral clamping, one such pair being shown in FIG. 2. Clamping apertures 14 and 14a in inserts 10 and 10a, respectively, form a substantially round opening which matches the outside diameter of the tube to be clamped and severed. The opening is slightly oblong; i,.e., larger vertically than horizontally so as to avoid skinning the top and/or bottom of the tubing during the closing or opening of the jaws, and to avoid a lockup of jaw to tube. Surface 14 is of such finish as to provide a high frictional characteristic thereby to minimize tube rotation during a severing operation.

A second pair of opposing jaws is typically placed axially behind the first set and spaced therefrom to provide a slot for the severing knife. The knife slot is always adjacent the hidden face in FIG. 1; i.e., the face which borders surface 14. Therefore, the tapered surface 16 is opposite the knife slot, whether for entry or exit of tubing.

Having described the structure of the die jaw insert 10 in the preferred embodiment, the method of manufacturing the insert will next be described.

FIG. 3 shows a block diagram which is a generalized representation of the steps in the manufacturing process. Block A represents the major fabrication step. In this step, metal stock is shaped to take on the general configuration of the insert 10, except that the insert is cut oversize and without clamping aperture 14. The rough cut is made in relatively soft, machinable metal, normally about 30$R_c$. This "roughing out" of the die jaw insert blank is accomplished by the selection of any of several metal milling machines such as the tape-controlled multi-axis machines available from Cincinatti Milling Machine Co.

The rough blank is next hardened and finish ground as represented in block B of FIG. 3. Heat treatment is required to harden the blank to withstand the physical conditions encountered in a tube cutoff apparatus. Typically the blank insert is heat treated to a hardness of 60$R_c$. The second step in block B entails finish grinding the hardened blank to exact size. This step inherently corrects for any distortions caused by the hardening process.

By the time the steps of block B are completed the blank die jaw insert is complete except for the shaping and finishing of the workpiece clamping aperture. The blank may now be placed on the shelf as inventory.

Once the order is received and the user's tube size specifications are known, the manufacturer may enter into the final phase of the process as indicated by block C of FIG. 3.

FIG. 4 shows electrical discharge machining (EDM) apparatus which is used to form the clamping apertures in complemental die jaw inserts 10 and 10$a$. This apparatus comprises a tank 25, a conductive plate 22 within the tank and grounded as shown, a variable frequency, variable amplitude current source 27, a vertically movable electrode holder 40 and a set of electrodes as hereinafter described. The apparatus may be purchased from Elox. Four applications of the EDM process are employed in the preferred embodiment of the present invention.

In FIG. 4 two complemental blank die jaw inserts 20 and 21 are being "rough cored" as the first step in the formation of the aperture. The blank inserts are placed on a conductive bed plate 22 such that the relieved surface 18 in FIG. 1 is uppermost. The blanks 20 and 21 are separated by a shim or spacer 23 of light metal. The bed plate 22 is immersed in a dielectric liquid 24.

The rough coring electrode 28 of FIG. 4 is enlarged and shown in cross-section in FIG. 5. This is a hollow, straight-sided cylinder having fairly thin walls and a small diameter neck. The outer diameter of the main electrode body is approximately 0.039 inches less than the final hole size in the insert to allow for finishing. Favorable results occur with a wall thickness 29 of approximately 0.080 inches. The neck 30 of electrode 28 is designed not only to accommodate electrical and structural support equipment, but also to allow a continuous flow of coolant 24 through the electrode 28 to flush away metal particles which separate from the blanks as the hole is machined.

Returning to FIG. 4, cutting occurs when the electrode 28 is closely proximate the blanks 20 and 21 to produce a continuous electrical discharge. The frequency and amplitude settings of the current source 27 control the cutting speed. Rough cutting is done with relatively high amplitude and low frequency. When electrode 28 has perforated the blanks 20 and 21 and the spacer 23, rough coring is completed and the electrode 28 is retracted from the work area.

In the next step, a chamfering electrode 31 is substituted for the rough coring electrode 28. FIG. 6 shows the chamfering electrode 31 in alignment with the rough core 32 prior to the chamfering process. Phantom lines 33 and 34 illustrate the appearance of the rough cored blank 35 after the tapered, chamfering electrode 31 has been applied. It is apparent from FIG. 6 that the chamfering electrode 31 does not fully penetrate the thickness of the rough cored blank 35. Rough chamfering is done with high current and low frequency settings of the current generator 27.

The last two applications of the EDM process are for the purpose of fine finishing the surfaces resulting from the rough coring and chamfering steps. The electrodes used for the finishing steps have similar configurations but diameters which are slightly larger than their counterpart electrodes 28 and 36 except that finish electrodes may be nearly solid; i.e., very thick walled similar to the electrode shown in FIG. 6. In addition, the finishing steps are carried out with relatively high frequency and low amplitude settings on the current generator 27. Again, the third and forth applications of the EDM process are substantially repetitions of the first application and use the same working arrangement as shown in FIG. 4.

Upon completion of the fine finishing steps the inserts 20 and 21 are removed from the tank 25 and are ready for shipment to the customer. The EDM produces a satin-like finish on the clamping aperture which has been found to have excellent gripping characteristics in a tube cutoff machine.

The embodiments of the invention in which an exclusive property or privilege is claimed are defined as follows:

1. A method of fabricating die jaw inserts for cutoff apparatus wherein said inserts are of the type comprising a hardened metal body terminating in an edge and having a clamping aperture opening to said edge and adapted to mate with a reversely similar insert to clamp a workpiece therebetween, the method comprising the steps of: fabricating a pair of reversely similar insert blanks which are machined to final dimensions and hardened beyond practicable machining but wherein said edges are uninterrupted by said aperture; placing said pair of reversely similar insert blanks on opposite sides of a shim strip such that the sides of the respective inserts which are to become the gripping surfaces of the workpiece abut the shim strip; and electrical discharge machining a circular bore symmetrical about the shim strip through the inserts and of sufficient diameter to cause the resultant bore to define circular arcs in the insert bodies whereby when said inserts are juxtaposed without said shim strip the reversely similar apertures of said bodies form an opening of slightly elliptic character.

2. The method as defined in claim 1 wherein the step of electrical discharge machining is carried out using an electrode having a hollow cylindrical configuration.

3. The method defined in claim 1 wherein the step of electrical discharge machining comprises the sub-step of coring out a rough hole at high current rate and thereafter finish machining the hole to final size at a low current cutting rate.

* * * * *